(12) United States Patent
Pavlas et al.

(10) Patent No.: US 10,423,783 B2
(45) Date of Patent: Sep. 24, 2019

(54) METHODS AND APPARATUS TO RECOVER A PROCESSOR STATE DURING A SYSTEM FAILURE OR SECURITY EVENT

(71) Applicant: Intel Corporation, Santa Clara, CA (US)

(72) Inventors: Chris Pavlas, Hillsboro, OR (US); James R. Hearn, Hillsboro, OR (US); Scott P. Dubal, Beaverton, OR (US); Patrick Connor, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 255 days.

(21) Appl. No.: 15/383,906

(22) Filed: Dec. 19, 2016

(65) Prior Publication Data

US 2018/0173580 A1 Jun. 21, 2018

(51) Int. Cl.
*G06F 11/00* (2006.01)
*G06F 21/55* (2013.01)
*G06F 11/14* (2006.01)
*G06F 11/20* (2006.01)

(52) U.S. Cl.
CPC ........ *G06F 21/554* (2013.01); *G06F 11/1441* (2013.01); *G06F 11/1446* (2013.01); *G06F 11/2015* (2013.01); *G06F 2221/034* (2013.01)

(58) Field of Classification Search
CPC ............. G06F 11/0751; G06F 11/0793; G06F 11/1441; G06F 11/1448; G06F 11/1469; G06F 21/554
USPC ......................................................... 714/22
See application file for complete search history.

(56) References Cited

U.S. PATENT DOCUMENTS

| | | | | |
|---|---|---|---|---|
| 4,458,307 A * | 7/1984 | McAnlis | ............. | G06F 11/1441 365/228 |
| 4,763,333 A * | 8/1988 | Byrd | ......................... | G06F 1/30 365/228 |
| 5,603,038 A * | 2/1997 | Crump | ...................... | G06F 1/30 713/310 |
| 6,901,298 B1 * | 5/2005 | Govindaraj | .......... | G05B 19/058 700/21 |
| 7,484,109 B2 * | 1/2009 | Feldman | ................... | G06F 1/28 713/300 |
| 7,685,466 B2 * | 3/2010 | Dunstan | .............. | G06F 11/0793 713/323 |
| 2009/0164814 A1 * | 6/2009 | Axford | ................. | G06F 1/3203 713/320 |

* cited by examiner

*Primary Examiner* — Jason B Bryan
(74) *Attorney, Agent, or Firm* — Hanley, Flight & Zimmerman LLC (57) ABSTRACT

Methods and apparatus to recover a processor state during a system failure or security event are disclosed. An example apparatus to recover data includes a processor including a local memory and a system monitor in communication with the processor. The system monitor is to copy processor backup data to a non-volatile memory in response to a processor backup event. The processor backup data includes contents of the local memory.

22 Claims, 7 Drawing Sheets

METHODS AND APPARATUS TO RECOVER A PROCESSOR STATE DURING A SYSTEM FAILURE OR SECURITY EVENT

FIELD OF THE DISCLOSURE

This disclosure relates generally to computer recovery and, more particularly, to methods and apparatus to recover a processor state during a system failure or security event.

BACKGROUND

In many computer systems, recovering from a sudden power failure, system lock, security attack (e.g., Distributed Denial of Service (DDoS), etc.) or other general system failure can take time. For example, in some situations a full reboot of the system is needed, which can result in an unacceptable amount of downtime for critical systems. Furthermore, in some situations, a full recovery of computer data is not possible. For example, in progress data writes that do not complete before the failure may be lost permanently.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

During a power loss event (e.g., a power outage, a failure of a power supply, etc.) or other type of system failure, data stored in the local memory registers of a processor and/or data not otherwise written to a non-volatile memory may be lost. Such data loss can be severe and result in corruption of data. To prevent data loss and/or data corruption, examples disclosed herein include energy storage circuitry to temporarily provide power to the system after main power is lost. More particularly, the energy storage circuitry ensures that there is enough energy stored to save of data stored in volatile memory (including the local memory registers of a main processor) at the time of the power loss into a non-volatile memory. In some examples, the amount of energy that can be stored in the energy storage circuitry (e.g., a supercapacitor) may be relatively limited. Accordingly, some disclosed examples use a high-speed non-volatile memory that can save the data relatively quickly (e.g., before energy stored in the energy storage circuitry dissipates).

By enabling the rapid writing of the contents of a processor's memory registers to a protected region of non-volatile memory, examples disclosed herein enable the recovery of data after a computer system failure (e.g., a loss of power). Beyond preserving in-progress data, in some examples, the full state of the system prior to the failure may be recovered. To achieve this, in some examples, the current clock value and the current state of the system at the time of failure is also written to the non-volatile memory. In this manner, when power is restored, the current clock value, the contents of the memory registers, and the operating state may be reloaded to the processor. Once the relevant data has been restored to the processor, the system bus may be reset to resume activity of the system from where it left off before the failure. In this manner, a state-full recovery may be achieved without the need for a system reboot and without the need for implementing a full hibernation sequence, either of which can take relatively long periods of time.

In addition to a system recovery in the event of a power failure, examples disclosed herein may be used for other purposes as well. In some examples, a security monitor may be provided to monitor a system for potential security threats. As soon as a potential security threat is detected, the security monitor may flag the security event and initiate the logging of subsequent process activity to the non-volatile memory for real-time or subsequent analysis. In this manner, potential threats to the system can be analyzed to develop procedures for the improved detection, prevention, and/or removal of such threats.

In other examples, a system monitor may function as a watchdog to monitor a heartbeat of the system to detect a lock event (e.g., a non-maskable interrupt, a bus master lock, etc.) in the bus activity based on the non-detection of the heartbeat after a threshold period of time. In some examples, the system monitor and the non-volatile memory are configured to operate independent of the main processor so as to capture the processor's register states and clock value even after a lock event. Using this independently retrieved and stored data, the system monitor may attempt to reset and, thus, recover the system (e.g., the main processor) without the need for a full reboot of the system. If the lock event occurs again, the data may be stored for subsequent analysis while the system implements a full memory dump and goes through a standard power cycle reboot.

Examples disclosed herein enable the migration of the full state of a processor to a new system. That is, in some examples, rather than using a complete snapshot of a processor state to recover or restore the processor after a failure, the data captured in the processor snapshot may be loaded into a different processor to resume operations where the first processor left off Such a migration may be beneficial after a power failure of the first processor when power cannot be immediately restored but where power is available to the second processor.

Examples disclosed herein achieve the above outcomes through the use of a system monitor that is implemented independent of a main processor in a processor platform while still being capable of reading and writing to the memory registers (local memory) of the main processor. That is, in some examples, the system monitor is executed in an auxiliary processor (or other logic circuit) different than the main processor. Additionally, in some examples, the system monitor has access to a system timer associated with the main processor. In some examples, the system timer is a high precision timer (HPT) developed by Intel™. In some examples, access to the main processor by the system monitor is configurable (e.g., via a bootloader such as, for example, a Basic Input/Output System (BIOS) or a Unified Extensible Firmware Interface (UEFI)). Further, in some examples, the system monitor is capable of reading and writing to a non-volatile random access memory (NVRAM). In some examples, the NVRAM is a high-speed memory such as, for example, a three-dimensional cross-point (3D XPoint™) memory (also referred to as "Apache Pass" or "AEP") developed by Intel™. In some examples, in response to detecting a power failure or other data transfer trigger event, the system monitor may retrieve the contents of the local memory of the main processor and the HPT value and write such data to the NVRAM. The system monitor, the main processor, and/or the NVRAM may be powered by an energy storage circuit (e.g., a supercapacitor, a battery, etc.) in the event of a power failure. In some examples, the NVRAM may be incorporated into the same processor platform as the main processor. In other examples, the NVRAM may be implemented external to and/or remote from the main processor.

Figure 1:
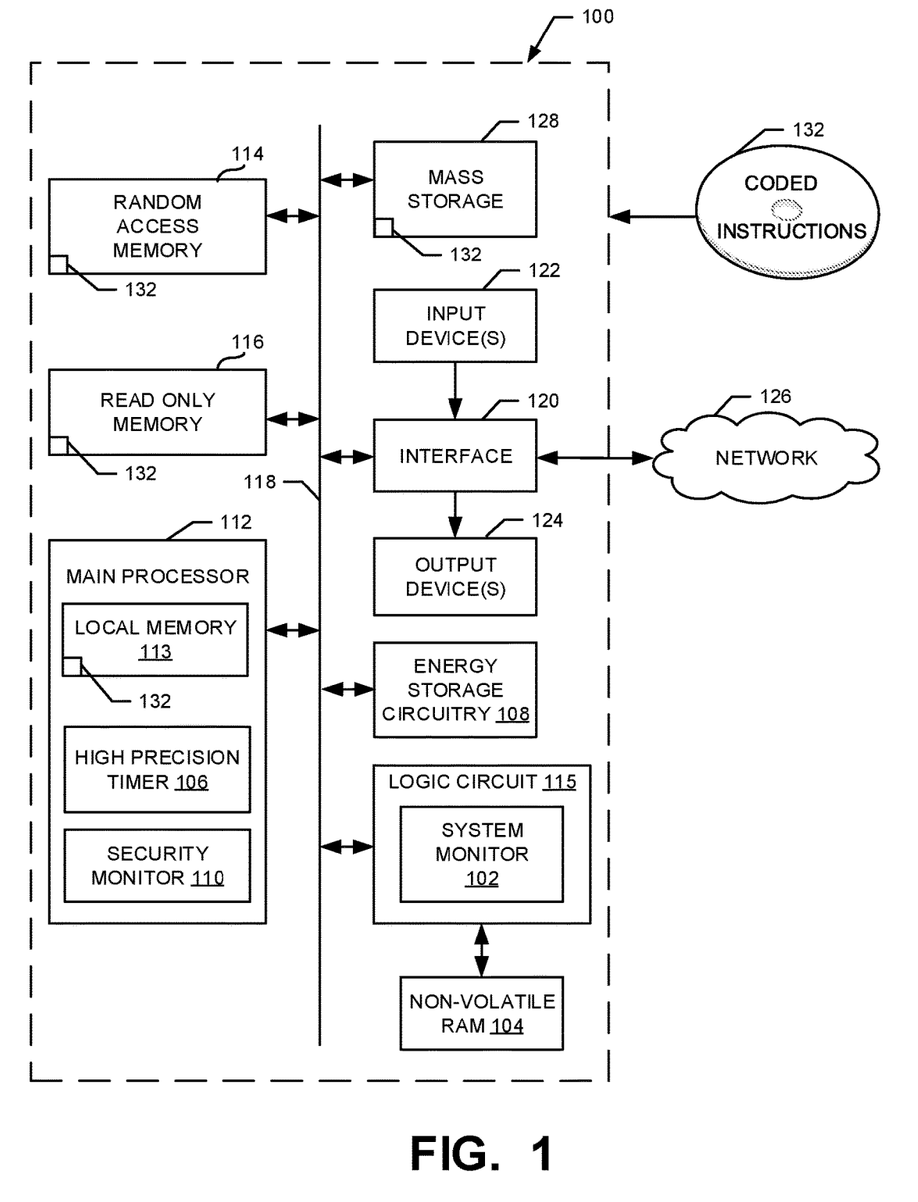
FIG. 1 is a block diagram of an example processor platform constructed in accordance with the teachings disclosed herein.

FIG. 1 is a block diagram of an example processor platform 100 capable of executing the instructions of FIGS. 4-7 to implement the example system monitor 102 of FIGS. 1 and/or 3. The processor platform 100 can be, for example, a server, a personal computer, a mobile device (e.g., a cell phone, a smart phone, a tablet such as an iPad™), a personal digital assistant (PDA), an Internet appliance, or any other type of computing device.

The processor platform 100 of the illustrated example includes a main processor 112. The processor 112 of the illustrated example is hardware. For example, the processor 112 can be implemented by one or more integrated circuits, logic circuits, microprocessors or controllers from any desired family or manufacturer.

The main processor 112 of the illustrated example includes a local memory 113 (e.g., a cache). The processor cache may be made up of one or more layers (e.g., L1, L2, LLC, etc.). The main processor 112 of the illustrated example is in communication with a main memory including a volatile memory 114 and a non-volatile memory 116 via a bus 118. The volatile memory 114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 116 may be implemented by flash memory and/or any other desired type of memory device. Access to the main memory 114, 116 is controlled by a memory controller.

The example processor platform 100 of FIG. 1 includes a logic circuit 115 that is separate from and independent of the main processor 112. In some examples, the logic circuit 115 is implemented by an auxiliary processor having its own local memory or cache. In other examples, the logic circuit 115 may be a dedicated circuit such as, for example, an application specific integrated circuit (ASIC), a field-programmable gate array (FPGA), a digital signal processor (DSP), etc. In the illustrated example, the logic circuit 115 is capable of executing the instructions of FIGS. 4-7 to implement the example system monitor 102 described in further detail in connection with FIG. 3. Alternatively, in some examples, the system monitor 102 may be implemented by a dedicated core of the main processor 112 that serves to monitor one or more other core(s) of the main processor 112.

As shown in the illustrated example of FIG. 1, the processor includes a high precision timer (HPT) 106. In some examples, the HPT 106 includes a 64-bit counter that is incremented every clock cycle of the processor 112. While the HPT 106 is shown in the illustrated example of FIG. 1, any type of high resolution system timer (e.g., that counts at a frequency of at least 10 MHz and utilizes 64-bit comparators) may alternatively be used (e.g., a high precision event timer (HPET)).

As shown in FIG. 1, the main processor 112 is in communication with the example system monitor 102 via the bus 118. In some examples, the system monitor 102 operates independent of the main processor 112 (e.g., in the separate logic circuit 115) but is capable of reading and writing to the memory registers (e.g., the local memory 113) and to the HPT 106 of the main processor 112. In some examples, access to the processor 112 by the system monitor 102 and/or triggers for the operation of the system monitor 102 are configurable (e.g., via the BIOS or the UEFI for the processor platform 100). In some examples, the system monitor 102 is not addressable from an outside source so as to avoid modifications to its core operations.

In the illustrated example, the system monitor 102 monitors the main processor 112 and/or, more generally, the components of the processor platform 100 for processor backup events. As used herein, a processor backup event is any event that triggers the system monitor 102 to retrieve and backup volatile data associated with the processor 112 to a non-volatile random access memory (NVRAM) 104. Example processor backup events include an unexpected power failure, a detected security threat, a hard lock on the system bus 118, and/or other potential system failures.

The data that is retrieved from the processor 112 and saved to the NVRAM 104 in response to detecting a trigger event (e.g., a processor backup event) is referred to herein as processor backup data. In some examples, processor backup data includes the contents of the local memory registers or cache of the processor 112 (e.g., data stored in the local memory 113). Additionally or alternatively, the processor backup data may include the contents of processor stack(s) (e.g., memory allocated for particular thread(s) of execution), the contents of processor heap(s) (e.g., dynamically allocated memory for particular application(s) being executed), and/or any other data (e.g., data values and/or machine readable instructions) stored in the non-volatile memory 114 associated with the processor 112. In some examples, the processor backup data may include a processor state value indicative of the current state of the processor 112 at the time of data retrieval (e.g., at the time of the detected processor backup event). In some examples, the processor backup data includes a current HPT value retrieved at the time of the detected processor backup event from the HPT 106.

In the illustrated example of FIG. 1, the processor platform 100 includes energy storage circuitry 108 that may store energy to provide power to the main processor 112, the logic circuit 115, and/or the NVRAM 104 in the event of loss of a primary power supply. In some examples, the energy storage circuitry 108 is implemented by a supercapacitor. In other examples, the energy storage circuitry 108 may be one or more batteries and/or any other suitable power source.

In some examples, the NVRAM 104 is implemented by a high-speed memory such as, for example, 3D XPoint™ NAND memory (also referred to as "Apache Pass" or "AEP") developed by Intel™. However, any other type of high-speed non-volatile memory may additionally or alternatively be used for the NVRAM 104. For example, NAND flash memory, NOR flash memory, ferroelectric memory, silicon-oxide-nitride-oxide-silicon (SONOS) memory, polymer memory such as ferroelectric polymer memory, ferroelectric transistor random access memory (FeTRAM or FeRAM), nanowire, phase change memory, phase change memory with switch, magnetoresistive random access memory (MRAM), spin transfer torque (STT) memory, etc. may additionally or alternatively be used. The relatively high-speed of the NVRAM 104 enables the rapid storage of the processor backup data when time is of the essence. For instance, the rapid storage of the processor backup data in the NVRAM 104 may be needed in the event of a power failure because the energy stored in the energy storage circuitry 108 may dissipate after a relatively short period of time. As another example, quickly storing the processor backup data after detecting a potential security threat may facilitate the subsequent analysis of the security event to establish security threat detection rules.

In addition to the memory speed and the amount of stored energy available, a third factor that impacts how much time is needed to completely preserve processor backup data is the amount of data to be stored. In some examples, the size of the local memory 113 or cache of the processor 112 may be limited to ensure that a complete snapshot of the processor state and all relevant data can be stored to the NVRAM 104 within the time constraints determined by the amount of energy stored in the energy storage circuitry 108 and the speed of the NVRAM 104. In some examples, the processor 112 may selectively switch between a full/unrestricted use of the cache (local memory 113) and a restricted/limited use of the cache depending on the failure risk tolerance of currents operations being executed. In other examples, the speed of the NVRAM 104 and/or energy storage capacity of the energy storage circuitry 108 may be selected to enable recovery of the processor cache based on an unrestricted use of the cache size.

In the illustrated example of FIG. 1, the NVRAM 104 is in direct communication with the system monitor 102 of the logic circuit 115 to enable the system monitor to directly read and write to the NVRAM 104. In other examples, the NVRAM 104 may be in communication with the system monitor 102 via the bus 118. Further, while the example of FIG. 1 shows the NVRAM 104 as being separate from the volatile memory 114, in some examples, the NVRAM 104 may serve the function of the volatile memory 114.

As mentioned above, a power failure (e.g., a power outage, a failure of a power supply, etc.) corresponds to a processor backup event that triggers the system monitor 102 to retrieve processor backup data and store the data to the NVRAM 104. In this manner, the data may be preserved as a complete snapshot of the processor at the time of the power failure that may be used for subsequent recovery of the processor. Thus, in some examples, once power is restored, the system monitor 102 writes the processor backup data back into the local memory 113 of the processor 112 and write the stored HPT value to the HPT 106 to restore the processor 112 to the same state at the time of the power failure. The system monitor 102 may initiate a hardware reset, thereby enabling the processor 112 to proceed with the same operations previously queued in its memory at the time of the power failure when the processor backup data was initially retrieved by the system monitor 102. Restoring the processor to its former state in this manner enables computer operations to resume nearly immediately (e.g., within seconds) when power is restored.

Existing solutions to an unexpected power failure often require a hard reset in which the system is rebooted, which can take a relatively long period of time (e.g., several minutes or more). Further, a system reboot often fails to provide a full recovery because data associated with in-progress operations at the time of the failure may be lost or corrupted, thereby necessitating re-execution of the relevant operations. Delays arising from power failure recoveries are especially problematic in the context of servers hosting virtual machines (VMs) (e.g., for cloud computing systems that implement software defined networks (SDNs) and/or software defined infrastructures (SDIs)) because not only must the host system reboot, but each VM must also be restarted. Examples disclosed herein avoid potentially long downtimes from unforeseen failures because the entire memory of the main processor of the host system is maintained for effectively immediate recovery when the failure event (e.g., power loss) has passed.

In some examples disclosed herein, the detection of a potential security threat is another type of processor backup event that triggers the operation of the system monitor 102. For instance, in the example of FIG. 1, the main processor 112 includes a security monitor 110 that serves to detect potential security attacks or other potential security threats and to trigger a processor backup event in response to detection of such attacks and/or threats. In some examples, definitions for security events detected by the security monitor 110 may be provided by a vendor via an application programming interface (API). In some examples, when the security monitor 110 detects a security event, the security monitor 110 sends a command (e.g., via an API) to the system monitor 102 of the logic circuit 115 to begin monitoring and/or logging the operations performed by the main processor 112 and/or the data values stored therein (e.g., in the local memory 113). In some examples, the security event is tagged and logged in the NVRAM 104. In some examples, the content logged in the NVRAM 104 corresponds to the processor backup data described above. That is, in some examples, the logged data corresponds to a snapshot of the processor state at a particular point in time. In some examples, the snapshot may be used to restore or recover the processor if the security threat results in a failure. Additionally or alternatively, in some examples, rather than retrieving a complete snapshot at a particular point in time, the system monitor 102 may log specific data activity in the local memory 113 of the processor over time until the security event has passed or the system monitor 102 receives an instruction to stop logging the data. In some examples, the logged processor backup data is made available for real-time and/or later analysis. In this manner, potential threats to the system can be analyzed to develop procedures for the improved detection, prevention, and/or removal of such threats.

In some examples, a system lock (e.g., a non-maskable interrupt, a bus master lock, etc.) corresponds to another example processor backup event that triggers the copying of processor backup data by the system monitor 102. The system monitor 102 of FIG. 1 may function as a watchdog to monitor a heartbeat (e.g., a periodically scheduled status signal) generated by the main processor 112. If the system monitor 102 fails to detect the heartbeat after a threshold period of time, the system monitor 102 may determine that system processes (associated with the main processor 112) have stopped potentially indicating a hardware lock. As explained above, the system monitor 102 operates independent of the main processor 112 so as not to be affected by the lock. As a result, upon detecting such an event, the system monitor 102 may retrieve the processor backup data as described above and attempt a system reset to overcome the lock. If the locked state recurs, a standard power cycle (e.g., a reboot) with a full memory dump may be necessary. However, in some such examples, the processor backup data stored at the time of the lock event is stored for subsequent analysis to potentially detect the root cause of the lock.

The processor platform 100 of the illustrated example also includes an interface circuit 120. The interface circuit 120 may be implemented by any type of interface standard, such as an Ethernet interface, a universal serial bus (USB), and/or a PCI express interface.

In the illustrated example, one or more input devices 122 are connected to the interface circuit 120. The input device(s) 122 permit(s) a user to enter data and commands into the main processor 112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 124 are also connected to the interface circuit 120 of the illustrated example. The output devices 124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 120 of the illustrated example, thus, typically includes a graphics driver card, a graphics driver chip or a graphics driver processor.

The interface circuit 120 of the illustrated example also includes a communication device such as a transmitter, a receiver, a transceiver, a modem and/or network interface card to facilitate exchange of data with external machines (e.g., computing devices of any kind) via a network 126 (e.g., an Ethernet connection, a digital subscriber line (DSL), a telephone line, coaxial cable, a cellular telephone system, etc.).

The processor platform 100 of the illustrated example also includes one or more mass storage devices 128 for storing software and/or data. Examples of such mass storage devices 128 include floppy disk drives, hard drive disks, compact disk drives, Blu-ray disk drives, RAID systems, and digital versatile disk (DVD) drives.

The coded instructions 132 of FIGS. 4-7 may be stored in the mass storage device 128, in the volatile memory 114, in the non-volatile memory 116, and/or on a removable tangible computer readable storage medium such as a CD or DVD. Additionally or alternatively, the coded instructions of FIGS. 4-7 may be stored in the NVRAM 104 and/or a separate volatile memory, non-volatile memory, and/or mass storage memory dedicated to the logic circuit 115.

Figure 2:
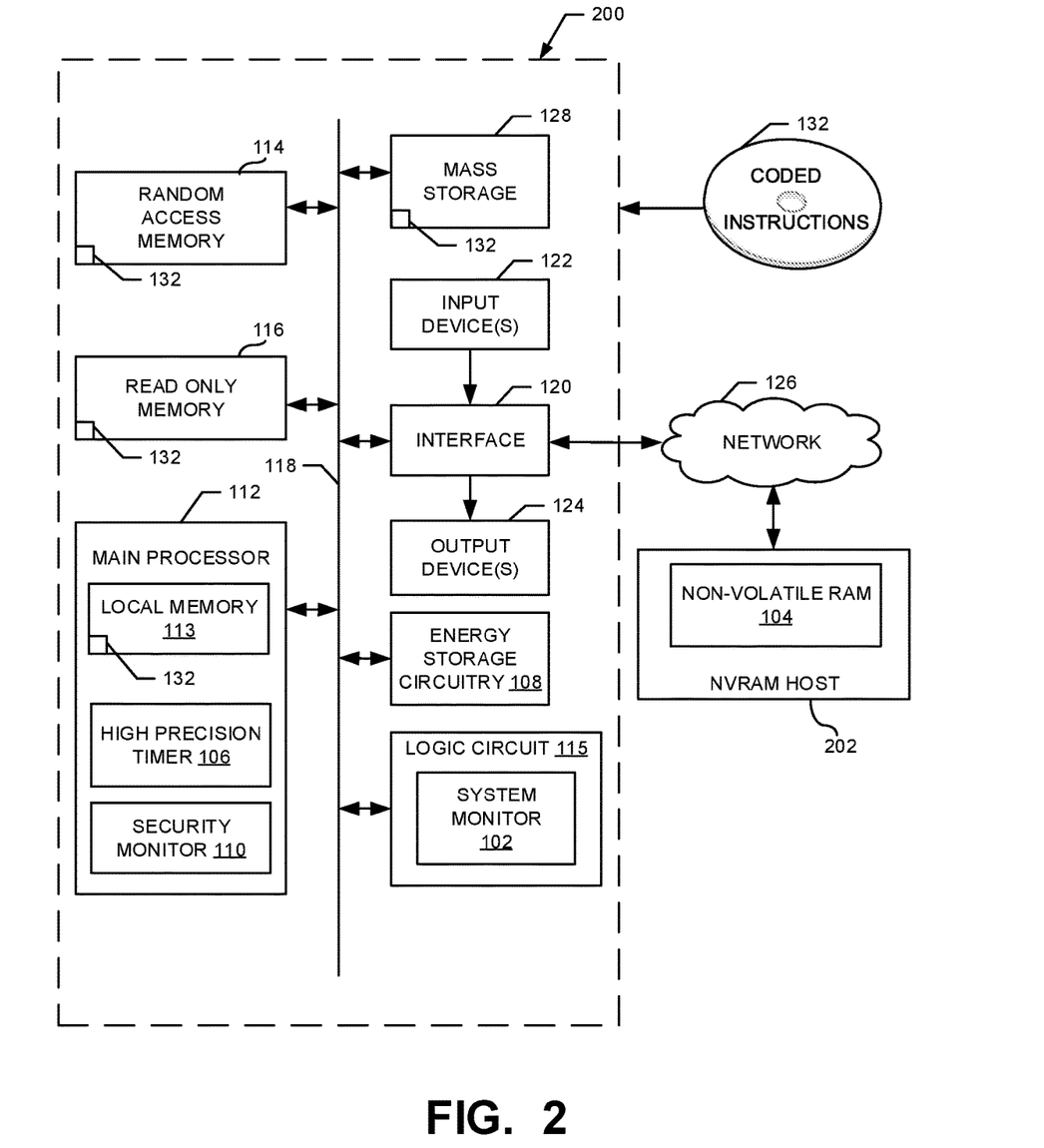
FIG. 2 is a block diagram of another example processor platform and an externally implemented non-volatile memory.

FIG. 2 is a block diagram of another example processor platform 200 capable of executing the instructions of FIGS. 4-7 to implement the example system monitor 102 of FIGS. 2 and/or 3. The processor platform 200 of FIG. 2 is substantially the same as the processor platform 100 of FIG. 1 with a similar main processor 112 that is in communication with a similar system monitor 102 implemented on a similar logic circuit 115 (e.g., an auxiliary processor) independent of the main processor 112. However, unlike the processor platform 100 of FIG. 1, the processor platform 200 of FIG. 2 does not include the NVRAM 104. Rather, as shown in FIG. 2, the NVRAM 104 is implemented within a NVRAM host 202 that is external and/or remote to the processor platform 200. As shown in the illustrated example, the system monitor 102 may communicate with the NVRAM 104 via the interface 120 and/or the network 126. In the illustrated example, the NVRAM host 202 may be implemented by any suitable computing device.

Figure 3:
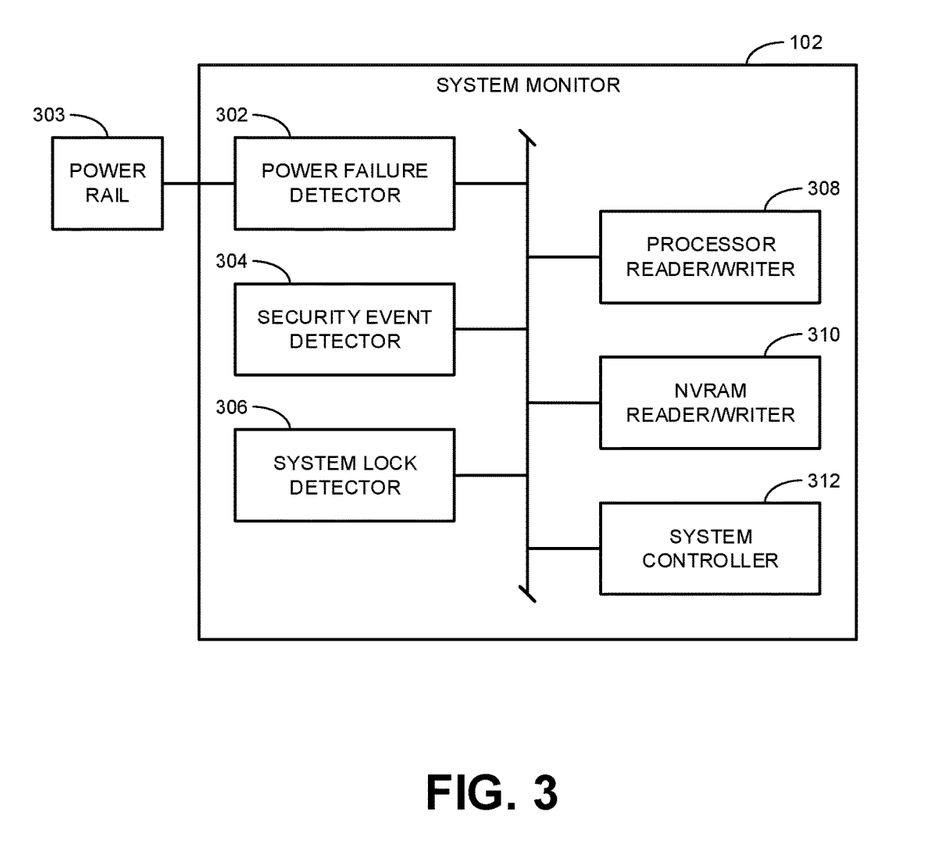
FIG. 3 illustrates an example implementation of the system monitor of FIGS. 1 and/or 2.

FIG. 3 is a block diagram illustrated an example implementation of the example system monitor 102 of FIGS. 1 and/or 2. The example system monitor 102 of FIG. 3 is provided with an example power failure detector 302, an example security event detector 304, an example system lock detector 306, an example processor reader/writer 308, an example NVRAM reader/writer 310, and an example system controller 312.

The system monitor 102 of FIG. 3 is provided with the example power failure detector 302 to detect a power failure and trigger a corresponding processor backup event. For example, the power failure detector 302 may monitor the 12V rail 303 of the power supply associated with the processor platform 100, 200. If the power failure detector 302 detects a loss of the 12V rail power, the power failure detector 302 triggers a processor backup event. In some examples, the power failure detector 302 also detects when power is restored.

The system monitor 102 of FIG. 3 is provided with the example security event detector 304 to detect a potential security event and trigger a corresponding processor backup event. In some examples, the security event detector 304 detects a potential security event by receiving a command from the security monitor 110 of the processor 112. In some examples, the security event detector 304 additionally or alternatively detects when the security event has been resolved and/or is to be ignored based on additional commands received from the security monitor 110.

The system monitor 102 of FIG. 3 is provided with the example system lock detector 306 to detect a potential system lock and trigger a corresponding processor backup event. In some examples, the system lock detector 306 detects a potential system lock by monitoring a heartbeat signal generated from the main processor 112 (e.g., via the bus 118). If no heartbeat is detected for a threshold period of time, the system lock detector 306 of this example triggers a processor backup event indicative of a potential system lock. If the system lock detector 306 detects a potential system lock after attempting to restore and reset the main processor 112 based on saved processor backup data, the system lock detector 306 of this example triggers a command to initiate a full reboot of the system.

The system monitor 102 of FIG. 3 is provided with the example processor reader/writer 308 to access the main processor 112 and retrieve the contents therefrom (e.g., processor backup data) for copying to the NVRAM 104. Additionally, the processor reader/writer 308 may access the main processor 112 to re-insert or restore processor backup data previously copied to the NVRAM 104.

The system monitor 102 of FIG. 3 is provided with the example NVRAM reader/writer 310 to write the processor backup data to the NVRAM 104 and to retrieve the processor backup data from the NVRAM 104 when needed.

The system monitor 102 of FIG. 3 is provided with the example system controller 312 to control the operation and interaction of the other elements of the system monitor 102. Further, in some examples, the system controller 312 may communicate with the processor 112 to initiate a system reset based on processor backup data retrieved from the NVRAM 104 and re-instated into the processor 112. Additionally or alternatively, in some examples, the system controller 312 may communicate with the processor 112 to initiate a full reboot of the system.

While an example manner of implementing the system monitor of FIGS. 1 and/or 2 is illustrated in FIG. 3, one or more of the elements, processes and/or devices illustrated in FIG. 3 may be combined, divided, re-arranged, omitted, eliminated and/or implemented in any other way. Further, the example power failure detector 302, the example security event detector 304, the example system lock detector 306, the example processor reader/writer 308, the example NVRAM reader/writer 310, the example system controller 312, and/or, more generally, the example system monitor 102 of FIG. 3 may be implemented by hardware, software, firmware and/or any combination of hardware, software and/or firmware. Thus, for example, any of the example power failure detector 302, the example security event detector 304, the example system lock detector 306, the example processor reader/writer 308, the example NVRAM reader/writer 310, the example system controller 312, and/or, more generally, the example system monitor 102 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example power failure detector 302, the example security event detector 304, the example system lock detector 306, the example processor reader/writer 308, the example NVRAM reader/writer 310, and/or the example system controller 312 is/are hereby expressly defined to include a non-transitory tangible computer readable storage device or storage disk such as a memory, a digital versatile disk (DVD), a compact disk (CD), a Blu-ray disk, etc. storing the software and/or firmware. Further still, the example system monitor 102 of FIGS. 1 and/or 2 may include one or more elements, processes and/or devices in addition to, or instead of, those illustrated in FIG. 3, and/or may include more than one of any or all of the illustrated elements, processes and devices.

Flowcharts representative of example machine readable instructions for implementing the system monitor 102 of FIG. 3 is shown in FIGS. 4-7. In these examples, the machine readable instructions implement a program for execution by a processor or other logic circuit such as the logic circuit 115 shown in the example processor platforms 100, 200 discussed above in connection with FIGS. 1 and 2. The program may be embodied in software stored on a non-transitory computer readable storage medium such as a CD-ROM, a floppy disk, a hard drive, a digital versatile disk (DVD), a Blu-ray disk, or a memory associated with the logic circuit 115, but the entire program and/or parts thereof could alternatively be executed by a device other than the logic circuit 115 and/or embodied in firmware or dedicated hardware. Further, although the example program is described with reference to the flowcharts illustrated in FIGS. 4-7, many other methods of implementing the example system monitor 102 may alternatively be used. For example, the order of execution of the blocks may be changed, and/or some of the blocks described may be changed, eliminated, or combined.

As mentioned above, the example processes of FIGS. 4-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable storage medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 4:
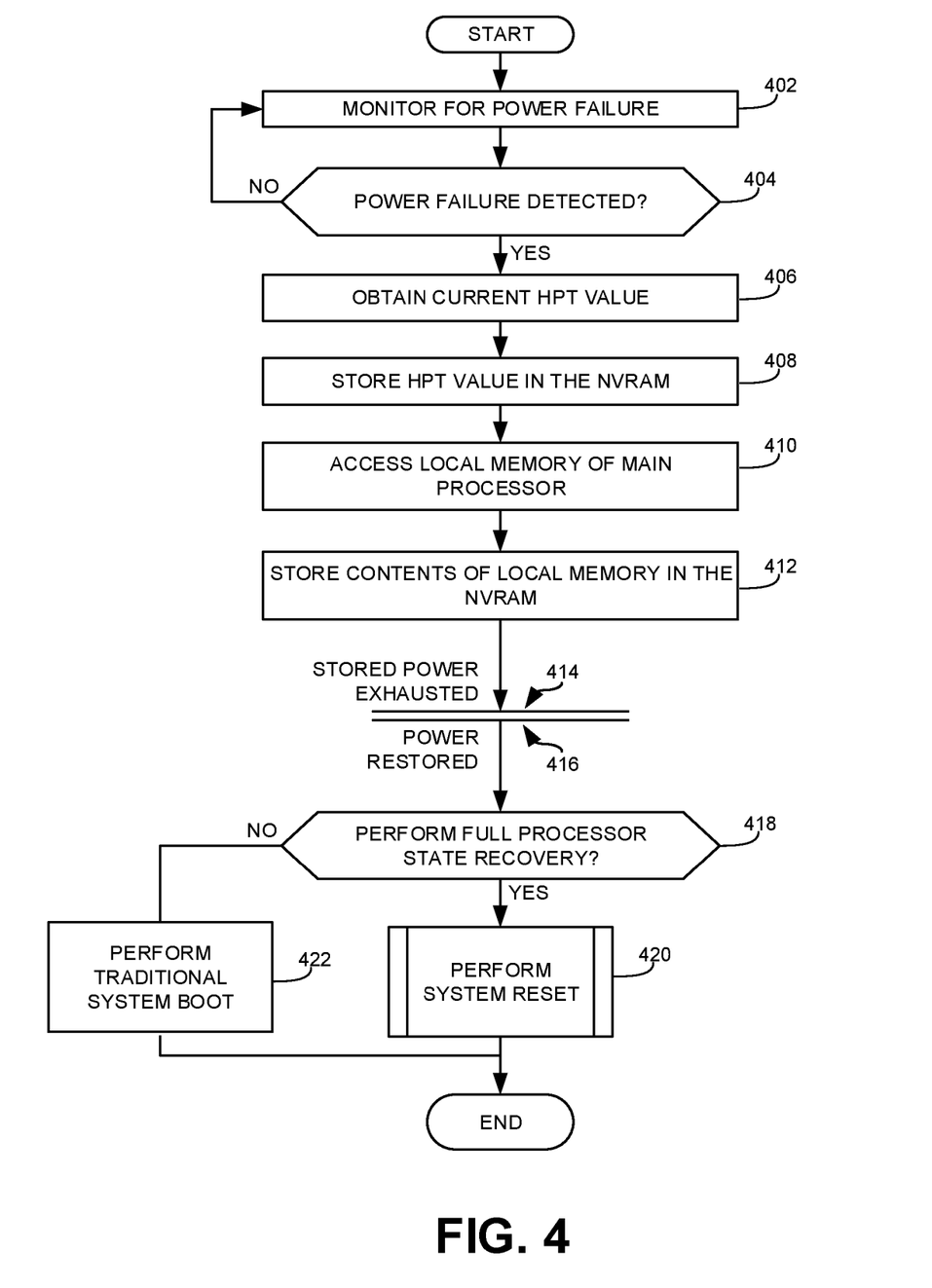
FIG. 4 is a flowchart representative of example machine-readable instructions that may be executed by the example processor platforms of FIGS. 1 and/or 2 to cause the example system monitor of FIG. 3 to respond to a power failure event.

The program of FIG. 4 begins at block 402 where the example power failure detector 302 monitors for a power failure. At block 404, the example power failure detector 302 determines whether a power failure is detected. If not, control returns to block 402. If a power failure is detected, control advances to block 406 where the example processor reader/writer 308 obtains the current HPT value. At block 408, the example NVRAM reader/writer 310 stores the HPT value in the NVRAM 104.

At block 410, the example processor reader/writer 308 accesses the local memory 113 of the main processor 112. At block 412, the example NVRAM reader/writer 310 stores the contents of the local memory in the NVRAM 104. In some examples, with a power failure having occurred (detected at block 404), blocks 406, 408, 410, 412 are performed using power from the energy storage circuitry 108. In some examples, the energy stored in the energy storage circuitry 108 may eventually dissipate or lose power (line 414). In some examples, the time before all power is lost, including power from the energy storage circuitry 108, may be relatively limited. Accordingly, in some examples, the NVRAM 104 is implemented using a high-speed memory to enable all of the processor backup data (e.g., the HPT value and the contents of the local memory 113) to be copied to the NVRAM 104 before all power is lost.

The time elapsed between line 414 and 416 is context and/or application specific. However long the power failure may last, upon restoration of power to the system (line 416), the example system controller 312 determines whether to perform a full processor state recovery (block 418). In some examples, whether a full processor state recovery is performed may be configurable (e.g., via the BIOS or the UEFI). Thus, in some examples, the example system controller 312 makes the determination at block 418 by reading an instruction stored in the mass storage device 128 of the corresponding processor platform 100, 200. If the example system controller 312 determines to perform a full processor state recovery, control advances to block 420, where the system controller 312 performs a system reset before the example program of FIG. 4 ends. Additional detail regarding the implementation of a system reset is described below in connection with FIG. 5. If the example system controller 312 determines not to perform a full processor state recovery, control advances to block 422 where the example system controller performs a traditional system reboot. Thereafter, the example program of FIG. 4 ends.

Figure 5:
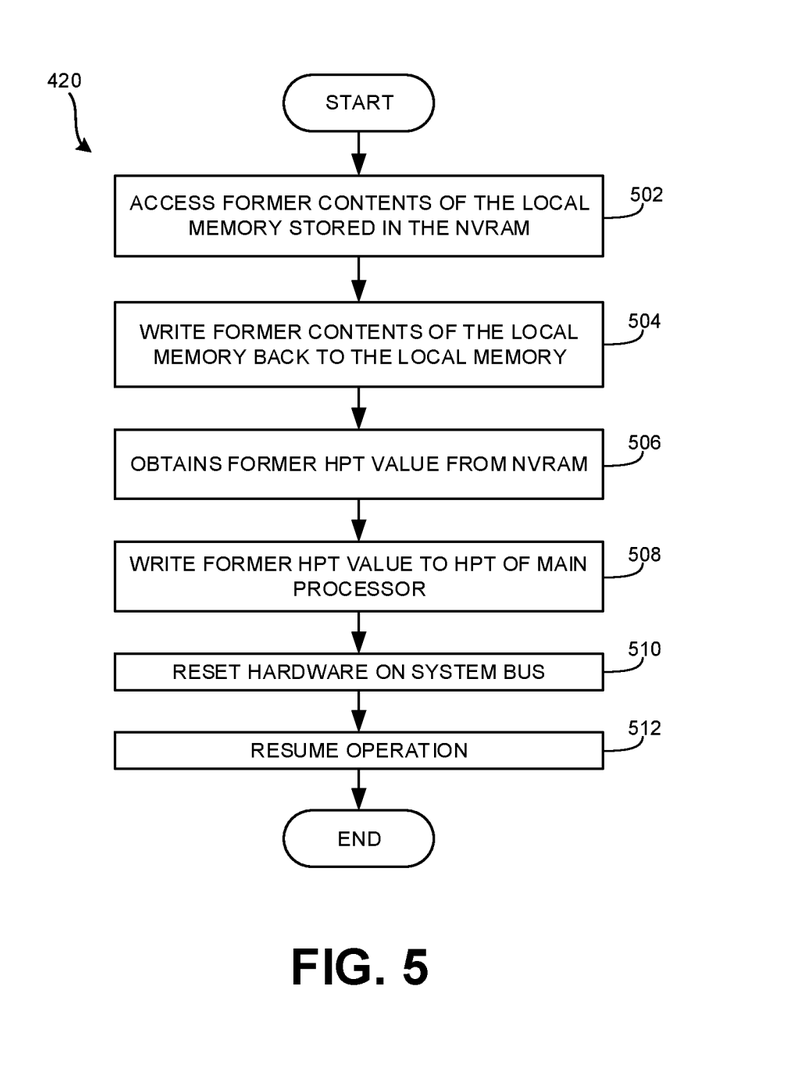
FIG. 5 is a flowchart representative of example machine-readable instructions that may be executed by the example processor platforms of FIGS. 1 and/or 2 to cause the example system monitor of FIG. 3 to perform a system reset for the processor of FIGS. 1 and/or 2.

The example program of FIG. 5 illustrates an example manner of implementing block 420 of FIG. 4 involving a system reset. The example program begins at block 502 where the example NVRAM reader/writer 310 accesses the former contents of the local memory 113 stored in the NVRAM 104. In the illustrated example, the contents of the local memory 113 are referred to as "former" contents of the local memory 113 in block 502 because when all power was lost (at line 414 of FIG. 4), the data stored in the volatile memory of the main processor 112 was lost and/or corrupted. At block 504, the example processor reader/writer 308 writes the former contents of the local memory 113 back to the local memory 113.

At block 506, the example NVRAM reader/writer 310 obtains the former HPT value from the NVRAM 104. At block 508, the example processor reader/writer 308 writes the former HPT value to the HPT 106 of the main processor 112. At block 510, the example system controller 312 resets the hardware on the system bus 118. At block 512, operations are resumed. Thereafter, the example program of FIG. 5 ends.

Figure 6:
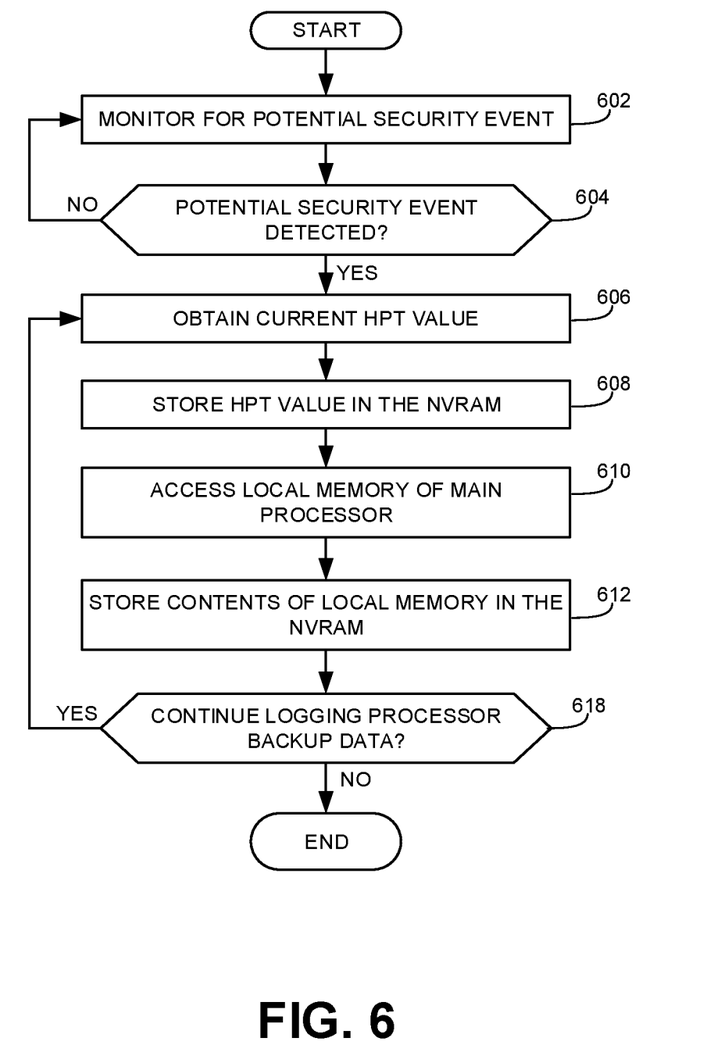
FIG. 6 is a flowchart representative of example machine-readable instructions that may be executed by the example processor platforms of FIGS. 1 and/or 2 to cause the example system monitor of FIG. 3 to respond to a potential security event.

The program of FIG. 6 begins at block 602 where the example security event detector 304 monitors for a potential security event. At block 604, the example security event detector 304 determines whether a potential security event is detected. In some examples, potential security events are detected based on commands received from the security monitor 110 of the main processor 112. If no potential security event is detected, control returns to block 402. If a potential security event is detected, control advances to block 606. Blocks 606, 608, 610, and 612 of FIG. 6 function the same as corresponding blocks 406, 408, 410, and 412 of FIG. 4 described above to retrieve processor backup data (e.g., the current HPT value and the contents of the local memory 113) and store the data (which may include instructions) as a complete snapshot of the processor state in the NVRAM 104. At block 618, the example security event detector 304 determines whether to continue logging processor backup data (including any instructions). In some examples, the logged processor backup data is stored to be analyzed (either in real-time or at a later point in time) to facilitate the create of rules to detect, prevent, and/or remove the potential security event. In some examples, logging may continue if the security monitor 110 of the processor indicates that the potential security event is an ongoing threat. If the example security event detector 304 determines logging of processor backup data is to continue, control returns to block 606. Thus, in some examples, a second complete snapshot of the main processor 112 may be stored at a second point in time. Additionally, or alternatively, rather that logging full snapshots of the processor, specific data activity associated with the main processor 112 may be gathered over time and stored in the NVRAM 104. If the example security event detector 304 determines to suspend or terminate logging processor backup data, the example process of FIG. 6 ends.

Figure 7:
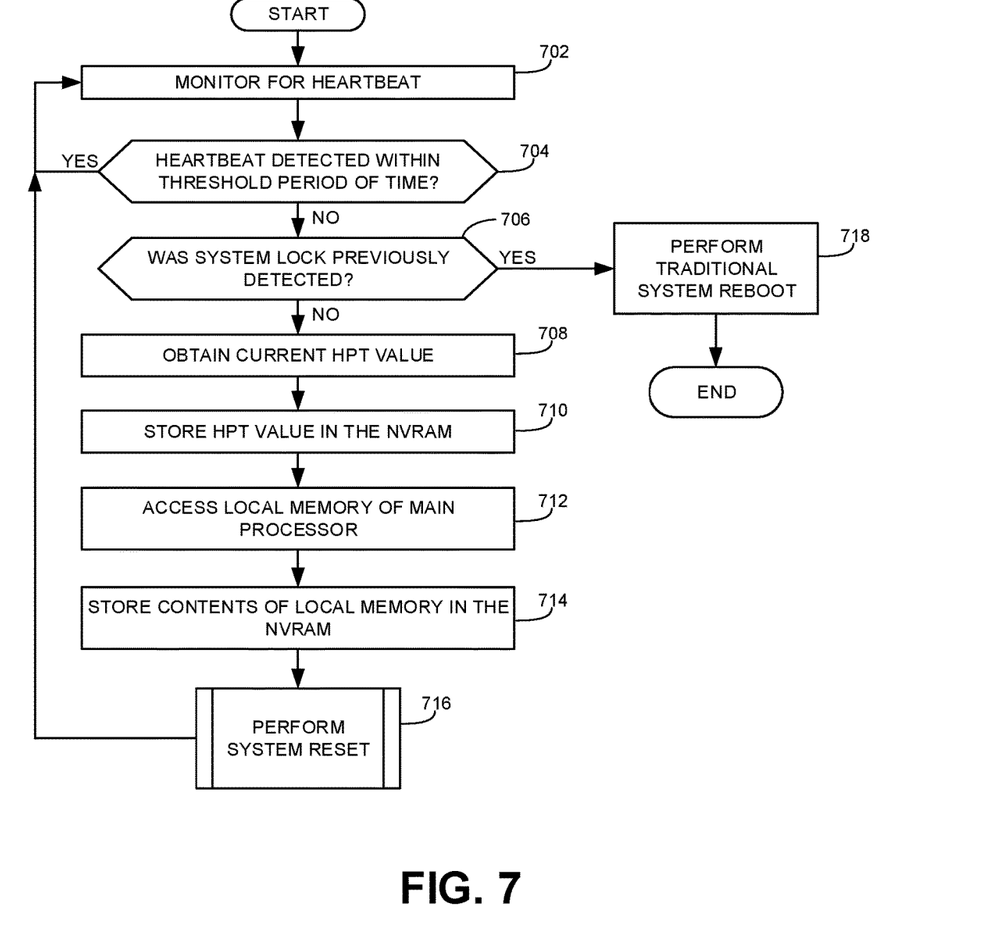
FIG. 7 is a flowchart representative of example machine-readable instructions that may be executed by the example processor platforms of FIGS. 1 and/or 2 to cause the example system monitor of FIG. 3 to respond to a system lock event.

The program of FIG. 7 begins at block 702 where the example system lock detector 306 monitors for a heartbeat. At block 704, the example system lock detector 306 determines whether a heartbeat is detected within a threshold period of time. If so, control returns to block 702 because the detected heartbeat indicates the main processor 112 has not experienced a system lock. However, if the example system lock detector 306 determines that a heartbeat has not been detected within the threshold period of time, control advances to block 706.

At block 706, the example system lock detector 306 determines whether a system lock was previously detected. The determination at block 706 serves to identify circumstances where a system lock occurs immediately (e.g., within a threshold time period) after a system reset was performed to restore the state of the main processor 112 in response to a pervious system lock event. If no system lock was previously detected (e.g., this is the first system lock detected after the threshold period following a system reset), control advances to block 708. Blocks 708, 710, 712, and 714 of FIG. 7 function the same as corresponding blocks 406, 408, 410, and 412 of FIG. 4 described above to retrieve processor backup data (e.g., the current HPT value and the contents of the local memory 113) and store the data in the NVRAM 104.

At block 716, the system controller 312 performs a system reset before control returns to block 702. The system reset of block 716 is the same as in block 420 of FIG. 4 described in greater detail in connection with the example process of FIG. 5. Thus, in the illustrated example of FIG. 7, in response to a system lock (detected based on the non-detection of the heartbeat), processor backup data (e.g., the HPT value and the contents of the local memory 113) are copied from the main processor 112 to the NVRAM 104. Thereafter, the system controller attempts to overcome the system lock by restoring the processor backup data to the main processor 112 to then monitor for a heartbeat to confirm whether the system reset overcame the system lock. Returning to block 706, if the example system lock detector 306 determines that a system lock was previously detected (e.g., this is a second system lock following a system reset at block 716), control advances to block 718 where the example system controller 312 performs a traditional system reboot. Thereafter, the example program of FIG. 7 ends.

From the foregoing, it will be appreciated that methods, apparatus and articles of manufacture have been disclosed to enable rapid power failure recovery of a main processor without a full system reboot once power is restored. Furthermore, examples disclosed herein enable a full state recovery of the main processor so that the processor may resume operations at effectively the same point where the processor left off at the time of the failure. These advantages are accomplished through the use of a supercapacitor or other energy storage circuitry that can, at least temporarily, provide power to the main processor and an independent logic circuit (implementing a system monitor) to enable the contents of the local memory registers, the system timer value, and/or the entire state of the main processor to be copied to a non-volatile memory. The storage of the contents (e.g., the entire contents) of the local memory, the timer value, and/or other relevant data associated with the main processor during the limited time window before the stored energy dissipates is further accomplished through the implementation of a high-speed non-volatile memory such as, for example, 3D XPoint™ NAND memory. The rapid backup of processor data may also be tagged and logged following the detection of a security event for subsequent analysis to improve future responses to security threats. Additionally, storing the entire state of a main processor (e.g., processor backup data) in a non-volatile memory may be used to potentially circumvent system lock events without the delay of a full system reboot by attempting to reset the system by reloading the stored processor backup data into the main processor Example 1 is an apparatus to recover data that includes a processor including a local memory. The apparatus also includes a system monitor in communication with the processor. The system monitor is to copy processor backup data to a non-volatile memory in response to a processor backup event. The processor backup data includes contents of the local memory.

Example 2 includes the subject matter of Example 1, wherein the apparatus includes the non-volatile memory.

Example 3 includes the subject matter of Example 1, wherein the non-volatile memory is external to the apparatus.

Example 4 includes the subject matter of any one of Examples 1-3, wherein the processor backup data is to be copied to the non-volatile memory at a first point in time. The system monitor is to initiate a system reset at a second point in time after the first point in time by writing the contents of the local memory stored in the non-volatile memory back to the local memory.

Example 5 includes the subject matter of Example 4, wherein the system reset provides a full state recovery of the processor at the first point in time without a full system reboot.

Example 6 includes the subject matter of any one of Examples 1-5, wherein the processor backup data includes a timer value of a system timer.

Example 7 includes the subject matter of any one of Examples 1-6, wherein the apparatus further includes an energy storage circuit to provide power to the processor and the system monitor during a power failure.

Example 8 includes the subject matter of Example 7, wherein the energy storage circuit includes a supercapacitor.

Example 9 includes the subject matter of any one of Examples 7 or 8, wherein the processor backup event corresponds to the power failure.

Example 10 includes the subject matter of Example 9, wherein the system monitor is to initiate a system reset when power is restored after the power failure by writing the timer value stored in the non-volatile memory into the system timer and writing the contents stored in the non-volatile memory into the local memory.

Example 11 includes the subject matter of any one of Examples 1-8, wherein the processor backup event corresponds to a security event.

Example 12 includes the subject matter of Example 11, wherein the apparatus further includes a security monitor to detect potential security threats. The security monitor is to cause the system monitor to trigger the security event when a potential security threat is detected.

Example 13 includes the subject matter of any one of Examples 11 or 12, wherein the processor backup data is first processor backup data logged by the system monitor at a first point in time in response to the security event. The system monitor is to log second processor backup data at a second point in time after the first point in time if the security event is an ongoing threat at the second point in time.

Example 14 includes the subject matter of any one of Examples 1-8, wherein the processor backup event corresponds to a system lock event.

Example 15 includes the subject matter of Example 14, wherein the system monitor is to identify the system lock event by failing to detect a heartbeat signal generated by the processor within a threshold period of time.

Example 16 includes the subject matter of Example 15, wherein the system monitor is to initiate a system reset in response to the system lock event by resetting the system timer to the timer value stored in the non-volatile memory and writing the contents of the non-volatile memory into the local memory.

Example 17 includes the subject matter of Example 16, wherein the system lock event is a first system lock event. The system monitor is to initiate a full system reboot in response to identifying a second system lock event within a threshold time period after the system reset.

Example 18 includes the subject matter of any one of Examples 6-17, wherein the system timer is a high precision timer.

Example 19 includes the subject matter of any one of Examples 1-18, wherein the non-volatile memory is three-dimensional cross-point memory.

Example 20 includes the subject matter of any one of Examples 1-18, wherein the processor is a main processor and the system monitor is implemented by a logic circuit independent of the main processor.

Example 21 is a method to recover data that includes detecting, by executing an instruction within an auxiliary processor, a processor backup event. The method further includes retrieving, by executing an instruction within the auxiliary processor, processor backup data from a main processor in response to the processor backup event. The main processor is different than the auxiliary processor. The processor backup data including contents of a local memory of the processor. The method also includes storing the processor backup data in a non-volatile memory.

Example 22 includes the subject matter of Example 21, wherein the non-volatile memory is incorporated into a processor platform containing the main processor and the auxiliary processor.

Example 23 includes the subject matter of Example 21, wherein the non-volatile memory is external to a processor platform containing the main processor and the auxiliary processor.

Example 24 includes the subject matter of any one of Examples 21-23, wherein the processor backup data is retrieved from the main processor at a first point in time. The contents of the local memory corresponding to a snapshot of a state of the main processor at the first point in time. The method further includes initiating a system reset at a second point in time after the first point in time by writing the contents of the local memory stored in the non-volatile memory to the local memory.

Example 25 includes the subject matter of Example 24, wherein the system reset restores the main processor to the state of the snapshot at the first point in time without a full system reboot.

Example 26 includes the subject matter of any one of Examples 21-25, wherein the processor backup data includes a timer value of a system timer.

Example 27 includes the subject matter of any one of Examples 21-26, wherein the processor backup event corresponds to a power failure.

Example 28 includes the subject matter of Example 27, wherein the method further includes providing power to the main processor after the power failure via energy storage circuitry.

Example 29 includes the subject matter of Example 28, wherein the energy storage circuitry includes a supercapacitor.

Example 30 includes the subject matter of any one of Examples 27-29, wherein the method further includes initiating a system reset when power is restored after the power failure by writing the timer value stored in the non-volatile memory into the system timer and writing the contents of the local memory stored in the non-volatile memory into the local memory.

Example 31 includes the subject matter of any one of Examples 21-26, wherein the processor backup event corresponds to a security event indicative of a potential security threat.

Example 32 includes the subject matter of Example 31, wherein the processor backup data is first processor backup data logged at a first point in time in response to the security event. The method further includes logging second processor backup data at a second point in time after the first point in time if the security event is an ongoing threat at the second point in time.

Example 33 includes the subject matter of any one of Examples 21-26, wherein the processor backup event corresponds to a system lock event.

Example 34 includes the subject matter of Example 33, wherein the method further includes identifying the system lock event by failing to detect a heartbeat signal generated by the main processor within a threshold period of time.

Example 35 includes the subject matter of any one of Examples 33 or 34, wherein the method further includes initiating a system reset in response to the system lock event by resetting the system timer to the timer value stored in the non-volatile memory and writing the contents of the local memory stored in the non-volatile memory back into the local memory.

Example 36 includes the subject matter of Example 35, wherein the system lock event is a first system lock event. The method further includes initiating a full system reboot in response to a second system lock event detected within a threshold time period after the system reset.

Example 37 includes the subject matter of any one of Examples 26-36, wherein the system timer is a high precision timer.

Example 38 includes the subject matter of any one of Examples 21-37, wherein the non-volatile memory is three-dimensional cross-point memory.

Example 39 is a non-transitory computer readable storage medium comprising instructions that, when executed, cause a machine to at least detect a processor backup event and retrieve processor backup data from a processor in response to the processor backup event. The processor backup data includes contents of a local memory of the processor. The instructions further cause the machine to store the processor backup data in a non-volatile memory.

Example 40 includes the subject matter of Example 39, wherein the non-volatile memory is incorporated into a processor platform containing the processor.

Example 41 includes the subject matter of Example 39, wherein the non-volatile memory is external to a processor platform containing the processor.

Example 42 includes the subject matter of any one of Examples 39-41, wherein the processor backup data is retrieved from the processor at a first point in time. The processor has a first state at the first point in time. The instructions further cause the machine to restore the processor to the first state at a second point in time after the first point in time by writing the contents of the local memory stored in the non-volatile memory to the local memory at the second point in time.

Example 43 includes the subject matter of Example 42, wherein the processor is restored to the first state without a full system reboot.

Example 44 includes the subject matter of any one of Examples 39-43, wherein the processor backup data includes a timer value of a system timer.

Example 45 includes the subject matter of any one of Examples 39-44, wherein the processor backup event corresponds to a power failure.

Example 46 includes the subject matter of Example 45, wherein the instructions further cause the machine to provide power to the processor after the power failure via an energy storage circuit.

Example 47 includes the subject matter of Example 46, wherein the energy storage circuit includes a supercapacitor.

Example 48 includes the subject matter of any one of Examples 45-47, wherein the instructions further cause the machine to initiate a system reset when power is restored after the power failure by writing the timer value stored in the non-volatile memory back into the system timer and writing the contents of the local memory stored in the non-volatile memory back into the local memory.

Example 49 includes the subject matter of any one of Examples 39-44, wherein the processor backup event corresponds to a security event indicative of a potential security threat.

Example 50 includes the subject matter of Example 49, wherein the processor backup data is first processor backup data logged at a first point in time in response to the security event. The instructions further cause the machine to log second processor backup data at a second point in time after the first point in time if the security event is an ongoing threat at the second point in time.

Example 51 includes the subject matter of any one of Examples 39-44, wherein the processor backup event corresponds to a system lock event.

Example 52 includes the subject matter of Example 51, wherein the instructions further cause the machine to identify the system lock event by failing to detect a heartbeat signal generated by the processor within a threshold period of time.

Example 53 includes the subject matter of any one of Examples 51 or 52, wherein the instructions further cause the machine to initiate a system reset in response to the system lock event by resetting the system timer to the timer value stored in the non-volatile memory and writing the contents of the local memory stored in the non-volatile memory back into the local memory.

Example 54 includes the subject matter of Example 53, wherein the system lock event is a first system lock event. The instructions further cause the machine to initiate a full system reboot in response to a second system lock event detected within a threshold time period after the system reset.

Example 55 includes the subject matter of any one of Examples 39-44, wherein the system timer is a high precision timer.

Example 56 includes the subject matter of any one of Examples 39-55, wherein the non-volatile memory is three-dimensional cross-point memory.

Example 57 is a non-transitory computer readable storage medium comprising instructions that, when executed, cause a machine to at least perform the method of any one of Examples 21-38.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to recover data, comprising:
   a processor;
   a local memory; and
   a system monitor in communication with the processor, the system monitor to:
      copy processor backup data to a non-volatile memory in response to a processor backup event, the processor backup data including contents of the local memory and a timer value of a system timer; and initiate a system reset by writing the timer value stored in the non-volatile memory into the system timer and writing the contents stored in the non-volatile memory into the local memory.

2. The apparatus of claim 1, wherein the processor backup data is to be copied to the non-volatile memory at a first point in time, the system monitor to initiate a system reset at a second point in time after the first point in time by writing the contents of the local memory stored in the non-volatile memory back to the local memory.

3. The apparatus of claim 2, wherein the system reset provides a full state recovery of the processor at the first point in time without a full system reboot.

4. The apparatus of claim 1, further including an energy storage circuit to provide power to the processor and the system monitor during a power failure.

5. The apparatus of claim 4, wherein the processor backup event corresponds to the power failure.

6. The apparatus of claim 1, wherein the processor backup event corresponds to a security event.

7. The apparatus of claim 6, further including a security monitor to detect potential security threats, the security monitor to cause the system monitor to trigger the security event when a potential security threat is detected.

8. The apparatus of claim 1, wherein the processor backup event corresponds to a system lock event.

9. The apparatus of claim 8, wherein the system monitor is to identify the system lock event by failing to detect a heartbeat signal generated by the processor within a threshold period of time.

10. The apparatus of claim 8, wherein the system lock event is a first system lock event, the system monitor to initiate a full system reboot in response to identifying a second system lock event within a threshold time period after the system reset.

11. The apparatus of claim 1, wherein the processor is a main processor and the system monitor is implemented by a logic circuit independent of the main processor.

12. The apparatus of claim 1, further including the non-volatile memory, wherein the non-volatile memory is to operate independent of the processor.

13. The apparatus of claim 1, wherein the non-volatile memory is external to the apparatus.

14. The apparatus of claim 1, wherein the non-volatile memory is three-dimensional cross-point memory.

15. An apparatus to recover data, comprising:
a processor;
a local memory; and
a system monitor in communication with the processor, the system monitor to:
copy first processor backup data to a non-volatile memory in response to a processor backup event corresponding to a security event, the first processor backup data including contents of the local memory, the first processor backup data logged by the system monitor at a first point in time in response to the security event; and log second processor backup data at a second point in time after the first point in time if the security event is an ongoing threat at the second point in time.

16. A method to recover data, comprising:
detecting a processor backup event;
retrieving, by executing an instruction with an auxiliary processor, processor backup data from a main processor in response to the processor backup event, the main processor different than the auxiliary processor, the processor backup data including content from a local memory of the main processor and a timer value of a system timer;
storing the processor backup data in a non-volatile memory; and
initiating a system reset by writing the timer value stored in the non-volatile memory into the system timer and writing the content from the local memory stored in the non-volatile memory back into the local memory.

17. The method of claim 16, wherein the processor backup data is retrieved from the main processor at a first point in time, the content from the local memory corresponding to a snapshot of a state of the main processor at the first point in time, the method further including initiating a system reset at a second point in time after the first point in time by writing the snapshot of the local memory stored in the non-volatile memory to the local memory.

18. The method of claim 17, wherein the system reset restores the main processor to the state of the snapshot at the first point in time without a full system reboot.

19. The method of claim 16, wherein the processor backup event corresponds to a power failure.

20. A non-transitory computer readable storage medium comprising instructions that, when executed, cause a machine to at least:
detect a processor backup event;
retrieve processor backup data from a processor in response to the processor backup event, the processor backup data including contents of a local memory of the processor and a timer value of a system timer corresponding to a clock of the processor; and
store the processor backup data in a non-volatile memory; and
initiate a system reset by writing the timer value stored in the non-volatile memory into the system timer and writing the contents stored in the non-volatile memory into the local memory.

21. The non-transitory computer readable storage medium of claim 20, wherein the processor backup data is retrieved from the processor at a first point in time, the processor having a first state at the first point in time, wherein the instructions further cause the machine to restore the processor to the first state at a second point in time after the first point in time by writing the contents of the local memory stored in the non-volatile memory to the local memory at the second point in time.

22. The non-transitory computer readable storage medium of claim 21, wherein the processor is restored to the first state without a full system reboot.

* * * * *